(12) United States Patent
Courbes (10) Patent No.: US 9,663,599 B2
(45) Date of Patent: May 30, 2017

(54) MULTICOMPONENT CATALYTIC SYSTEM, PROCESS FOR PREPARING SAME AND ISOPRENE POLYMERIZATION PROCESS USING SAME

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventor: Gael Courbes, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE, S.A., Granges-Paccot (CH)

( * ) Notice: Subject to any disclaimer, the term of this patent is extended or adjusted under 35 U.S.C. 154(b) by 0 days.

(21) Appl. No.: 14/649,261

(22) PCT Filed: Dec. 3, 2013

(86) PCT No.: PCT/EP2013/075437
§ 371 (c)(1),
(2) Date: Jun. 3, 2015

(87) PCT Pub. No.: WO2014/086804
PCT Pub. Date: Jun. 12, 2014

(65) Prior Publication Data
US 2015/0315312 A1    Nov. 5, 2015

(30) Foreign Application Priority Data

Dec. 4, 2012    (FR) .................................... 12 61576

(51) Int. Cl.
*C08F 136/08*    (2006.01)
*C08F 36/08*    (2006.01)

(52) U.S. Cl.
CPC ............ *C08F 136/08* (2013.01); *C08F 36/08* (2013.01)

(58) Field of Classification Search
None
See application file for complete search history.

(56) References Cited

U.S. PATENT DOCUMENTS

| 4,461,883 A | 7/1984 | Takeuchi et al. |
| 8,188,195 B2 * | 5/2012 | Luo .......................... C08C 19/44 525/332.8 |

(Continued)

FOREIGN PATENT DOCUMENTS

| EP | 1845118 | 10/2007 |
| FR | 2939801 | 6/2010 |
| GB | 2101616 | 1/1983 |

OTHER PUBLICATIONS

International Search Report for PCT/EP2013/075437 dated Mar. 19, 2014.

*Primary Examiner* — Catherine S Branch
(74) *Attorney, Agent, or Firm* — Dickinson Wright PLLC (57) ABSTRACT

A multicomponent preformed catalytic system based at least:
on isoprene;
on a rare earth metal salt of an organic phosphoric acid or of a carboxylic acid;
on a saturated or unsaturated inert hydrocarbon solvent, the boiling point of which is below 40° C. at atmospheric pressure;
on an alkylating agent consisting of a specific trialkylaluminium; and
on a halogen donor consisting of an alkylaluminium halide.

This catalytic system comprises the rare earth metal in a concentration greater than or equal to 0.005 mol/l. The (Continued)

catalytic system makes possible polymerizing isoprene, with a good catalytic activity, in solution in a volatile hydrocarbon solvent while benefiting from the economic advantage linked to a volatile solvent process, which is also a subject of the invention. The diene elastomers obtained have a high content of cis-1,4 linkages.

26 Claims, 1 Drawing Sheet

(56) References Cited

U.S. PATENT DOCUMENTS

2003/0187162 A1  10/2003  Rachita
2007/0255029 A1  11/2007  Robert

* cited by examiner

MULTICOMPONENT CATALYTIC SYSTEM, PROCESS FOR PREPARING SAME AND ISOPRENE POLYMERIZATION PROCESS USING SAME

This application is a 371 national phase entry of PCT/EP2013/075437, filed 3 Dec. 2013, which claims benefit of French Patent Application No. 1261576, filed 4 Dec. 2012, the entire contents of which are incorporated herein by reference for all purposes.

BACKGROUND

1. Field

The present disclosure relates to a catalytic system based on a rare earth salt that is particularly suitable for the cis-1,4 stereospecific polymerization of isoprene, and also to a process for synthesizing polyisoprene having a high cis-1,4 content using this catalytic system.

2. Description of Related Art

The synthesis of polyisoprene having a high content of cis-1,4 units on an industrial scale constitutes a major challenge for the tire industry since these are polymers which, modified or unmodified, have characteristics similar to those of natural rubber.

Chain polymerization via coordination catalysis constitutes the main chemistry for preparing synthetic polyisoprenes having a high content of cis-1,4 units. Use is generally made of a multicomponent catalytic system based on a rare earth metal consisting of at least:

- an organic phosphoric acid salt or an organic carboxylic acid salt of one or more rare earth metals,
- a hydrocarbon solvent, generally cyclohexane or methylcyclohexane,
- an alkylating agent, generally consisting of a trialkylaluminium or a dialkylaluminium hydride, and, where appropriate,
- a preforming conjugated diene monomer, essentially butadiene, and/or
- a halogen donor.

Such catalytic systems are described in particular in international patent applications WO 02/38635, WO 02/38636, WO 03/097708, WO 02/48218 A1, WO 2006133757 A1 and WO 2007045417 A1 in the name of the Applicant companies.

In order to reduce the production costs, it appears advantageous to carry out the polymerization of isoprene in the presence of a volatile aliphatic hydrocarbon solvent. This is understood to mean an aliphatic hydrocarbon solvent, the boiling point of which is below 40° C. at atmospheric pressure. Indeed, this would lead to an industrial process that is less expensive in terms of energy since the removal of the volatile solvent in the step of recovering the synthesized polymer is facilitated by its low boiling point.

In the generally continuous processes used in industrial units, the polymerization solvent is commonly recovered at the end of the synthesis in order to be used again upstream of the process. In this context, a major drawback of the catalytic systems most commonly used for synthesizing polyisoprene is that they are prepared and diluted in a hydrocarbon aliphatic solvent comprising at least 6 carbon atoms, such as cyclohexane or methylcyclohexane, as described in document WO 02/38635 or WO 02/48218 A1. The removal of such solvents, which will be denoted as "heavy" in the remainder of the document, requires significant extraction temperatures, much higher than the boiling point of the volatile polymerization solvent. Moreover, depending on the industrial process used and its configuration, the use of a catalytic system prepared in a heavy solvent would lead to a mixture of heavy solvent and of volatile solvent being obtained in the process, then generally to the accumulation of the heavy solvent introduced by the catalyst in the volatile polymerization solvent. This would lead to an expensive supplementary step of separating the volatile and heavy solvents in order to be able to continue to carry out the polymerization in the volatile solvent, according to the aforementioned advantage.

SUMMARY

The use of butadiene as preforming monomer of the catalytic system is widespread, including for synthesizing polyisoprene as is described in particular in document WO 02/38635 or WO 02/48218 A1. With a view to polymerizing isoprene in a volatile hydrocarbon aliphatic solvent on an industrial scale, the Applicant companies have demonstrated that the catalytic systems preformed with butadiene, prepared according to the aforementioned patent documents, are not soluble in the volatile solvents, in particular in the volatile alkanes that are the most widely available commercially. This insolubility promotes the fouling of the industrial plants used for the preparation of the multicomponent catalytic system, and also of the lines for injecting catalyst into the polymerization reactor, requiring expensive industrial plant shutdown, cleaning and restarting sequences.

It therefore turns out that the reduction of the production costs, by the use of a volatile solvent for polymerizing isoprene on an industrial scale is not guaranteed. Specifically, the catalytic systems commonly used for synthesizing polyisoprene do not make it possible to retain the economic advantage of a synthesis in a volatile solvent.

One objective of an embodiment of the invention is to propose a process for synthesizing polyisoprene having a high content of cis-1,4 units, improved with respect to those conventionally implemented by reducing in particular the operating cost, which is suitable for an industrial application.

Another object of an embodiment of the invention is to have a catalytic system that is particularly suitable for such a synthesis process that retains a level of stereospecificity for obtaining high contents of cis-1,4 units and a catalytic activity at least equivalent to prior catalytic systems.

These objectives are achieved in that the inventor has developed a novel rare earth-based multicomponent catalytic system that is particularly suitable for the synthesis of polyisoprene in a volatile solvent on an industrial scale. The invention thus makes it possible to propose a process for synthesizing polyisoprene having a high content of cis-1,4 units, having the economic advantage provided by the use of a volatile polymerization solvent. The use of the novel catalytic system in the process of the invention makes it possible to prevent fouling of the industrial catalyst production units and of the lines for injecting catalyst into the polymerization reactor. The use of the novel catalytic system in the process of the invention also makes it possible to reduce the energy cost of the process.

The distinctive feature of this catalytic system is that it is prepared in a volatile solvent in which it is completely soluble. The use thereof makes it possible to reduce the production costs significantly by avoiding, according to certain variants, any supplementary step of purification of the solvent recycled in the process, and also the energy costs by not requiring excessive consumption of steam during the recovery of the polyisoprene. Furthermore, it makes it possible to retain a high catalytic activity, while preserving the essential features of the diene elastomer synthesized, in particular a high cis-1,4 stereospecificity. More specifically, the use of this catalytic system for the polymerization of isoprene enables the synthesis, with a catalytic activity at least equivalent to that observed with the catalytic systems of the prior art, of polyisoprenes having a content of cis-1,4 linkages of at least 96%.

Thus, a first subject of the invention is a multicomponent catalytic system based at least:
  on isoprene, as preforming monomer,
  on an organic phosphoric acid salt or a carboxylic acid salt of one or more rare earth metals,
  on an inert volatile hydrocarbon solvent,
  on an alkylating agent consisting of a selection of trialkylaluminium of formula $AlR_3$, in which R represents an alkyl radical, preferably having from 1 to 10 carbon atoms,
  on a halogen donor consisting of an alkylaluminium halide;
this catalytic system comprising the rare earth metal(s) in a concentration greater than or equal to 0.005 mol/l.

Another subject of the invention is a process for preparing said multicomponent catalytic system.

A further subject of the invention is a process for synthesizing a polyisoprene having a high content of cis-1,4 units by polymerization in a volatile solvent of at least isoprene in the presence of said multicomponent catalytic system.

The expression "based on" used to define the constituents of the catalytic system is understood to mean the mixture of these constituents, or the product of the reaction of a portion or of all of these constituents.

Moreover, any range of values denoted by the expression "between a and b" represents the range of values extending from more than a to less than b (i.e. with limits a and b excluded) whereas any range of values denoted by the expression "from a to b" signifies the range of values extending from a through to b (i.e. including the strict limits a and b).

DETAILED DESCRIPTION OF SPECIFIC EMBODIMENTS

Figure 1:
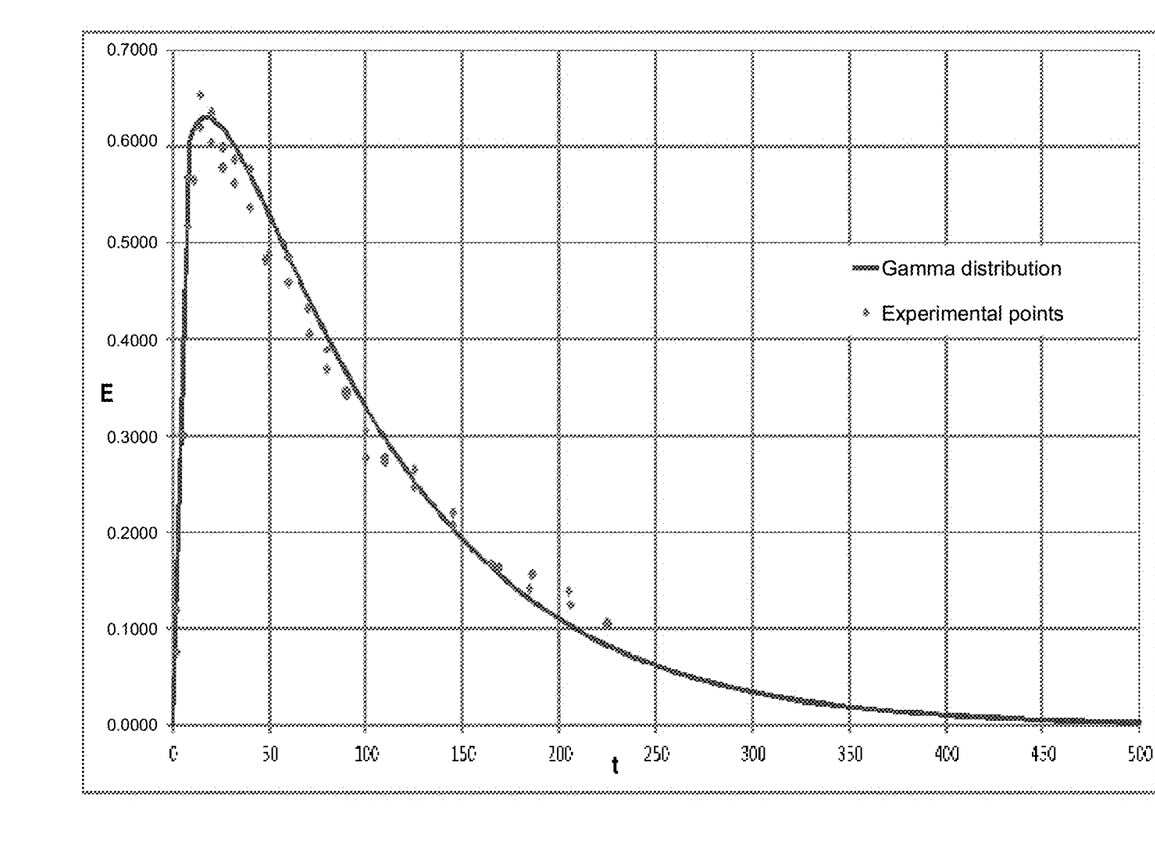
The FIGURE is a graph showing residence time distribution for polymerization of isoprene according to an embodiment of the invention.

Thus, a first subject of the invention is a multicomponent catalytic system based at least:
  on isoprene, as preforming monomer,
  on a rare earth metal salt of an organic phosphoric acid, or on a rare earth metal salt of a carboxylic acid;
  on a saturated or unsaturated inert hydrocarbon solvent, the boiling point of which is below 40° C. at atmospheric pressure;
  on an alkylating agent consisting of a trialkylaluminium of formula $AlR_3$, in which R represents an alkyl radical preferably having from 1 to 10 carbon atoms, selected from trimethylaluminium, triethylaluminium, tri-n-propylaluminium, triisopropylaluminium, tri-n-butylaluminium, tri-t-butylaluminium, tri-n-pentylaluminium, tri-n-hexylaluminium, tri-n-octylaluminium, tricyclohexylaluminium; and
  on a halogen donor consisting of an alkylaluminium halide, the alkyl radical preferably having from 1 to 8 atoms;
this catalytic system comprising the rare earth metal in a concentration greater than or equal to 0.005 mol/l.

Thus, a first constituent element of the multicomponent catalytic system according to an embodiment of the invention is isoprene, as preforming monomer.

It will be noted that the (preforming isoprene/rare earth salt) molar ratio may have a value ranging from 5 to 100, preferably from 10 to 90 and more preferably still from 15 to 70, or even from 25 to 50.

A second constituent element of the multicomponent catalytic system according to the invention is the rare earth(s) metal salt. The expression "rare earth metal" is understood to mean any element from the family of lanthanides, or yttrium, or else scandium. Preferably, the rare earth element is an element from the family of lanthanides, more preferably neodymium.

As rare earth metal salt that can be used in this catalytic system, use may advantageously be made of:
  according to a first variant of the invention: a rare earth salt of an organic phosphoric acid, or else,
  according to a second variant of the invention: a rare earth salt of a carboxylic acid.

When the rare earth metal salt is a rare earth salt of an organic phosphoric acid, or rare earth organophosphate, this may be a phosphoric acid diester of general formula (R'O)(R"O)PO(OH), in which R' and R", which are identical or different, represent a saturated or unsaturated $C_1$-$C_{10}$ alkyl radical, a $C_6$-$C_{12}$ aryl radical or a $C_7$-$C_{22}$ alkylaryl radical. Among these phosphoric acid diesters, R' and R", which are identical or different, are preferably an n-butyl, isobutyl, n-pentyl, isopentyl, 2,2-dimethylhexyl, 1-ethylhexyl, 2-ethylhexyl, tolyl, oleyl or linoleyl radical. Among these organophosphates, bis(2-ethylhexyl)phosphate is preferred.

It is also possible to use, as salt, a mixture of several rare earth(s) metal salts of organic phosphoric acid.

As rare earth(s) metal salt of an organic phosphoric acid that can be used according to the invention, mention may preferably be made of neodymium tris[bis(2-ethylhexyl)-phosphate].

The rare earth(s) salt of an organic phosphoric acid may, according to one variant, be used in the form of a solution in a hydrocarbon aliphatic or cycloaliphatic solvent, preferably identical to the solvent of the catalytic system. As rare earth(s) salt of a phosphoric acid, use may for example be made of a rare earth organophosphate that is commercially available or else that is synthesized according to the invention described in WO 2009/083480 A1. According to one advantageous use of this variant of the invention, the solution of the rare earth(s) salt of a phosphoric acid comprises, besides the organophosphoric acid residual to the preparation of the salt, an organic or mineral acid having a pKa at 25° C. of less than 2.5 as described in the Applicant companies' patent application WO 10/133608.

When the rare earth metal salt is a carboxylate, this may be a carboxylate of a linear or branched aliphatic carboxylic acid having from 6 to 20 carbon atoms in the linear chain, or of aromatic carboxylic acids having one or more substituted or unsubstituted aromatic rings. By way of example, mention may be made of neodecanoate (versatate), 2-ethylhexanoate, octanoate and hexanoate, which are linear or branched, or else substituted or unsubstituted naphthenates. Among the carboxylates, 2-ethylhexanoate and neodecanoate are preferred.

Use may also be made, as salt, of a mixture of several rare earth(s) metal salts of carboxylic acid.

As rare earth metal salts of a carboxylic acid that can be used in the catalytic system in accordance with an embodiment of the invention, mention may preferably be made of neodymium organocarboxylates, and preferably neodymium tris[2-ethylhexanoate] or neodymium tris[versatate].

According to one advantageous variant of the invention, the rare earth metal salt is a rare earth salt of an organic phosphoric acid, or rare earth organophosphate. Indeed, according to this variant, it is possible to attain a high catalytic activity by using lower contents of alkylating agent than with a rare earth carboxylate, namely starting from the low (alkylating agent/rare earth(s) salt) ratios of at most 30, or even of at most 15, or else of at most 10, preferably of from 4 to 10. This low consumption of alkylating agent contributes to the reduction of the costs for the implementation of the invention.

The rare earth(s) salt may be prepared in a manner known per se.

The catalytic system in accordance with an embodiment of the invention comprises the rare earth metal in a concentration greater than or equal to 0.005 mol/l. Preferably, the concentration of rare earth metal in the catalytic system has a value ranging from 0.010 mol/l to 0.1 mol/l and more preferably still ranging from 0.02 to 0.08 mol/l.

Another constituent element of the catalytic system according to an embodiment of the invention is a saturated or unsaturated, inert hydrocarbon solvent, the boiling point of which is below 40° C. at atmospheric pressure. Particularly suitable are light aliphatic or alicyclic hydrocarbon solvents having at most five carbon atoms. In this regard, mention may be made of $C_5$ light alkanes such as n-pentane, 2-methylbutane, 2,2-dimethylpropane or a mixture of these solvents. Mention may also be made of other aliphatic, unsaturated, inert C5 hydrocarbon solvents such as 1-pentene, 2-pentene, 2-methyl-1-butene, 3-methyl-1-butene, 2-methyl-2-butene, or a mixture of these solvents.

Preferably, the inert hydrocarbon solvent, the boiling point of which is below 40° C. at atmospheric pressure, is an alkane, more preferably n-pentane. Indeed, alkanes are readily available commercially thus guaranteeing a consistency in the quality and the composition of the solvent, and also a reduction in the production cost.

According to one particularly advantageous implementation of the invention, the solvent of the catalytic system is identical to the volatile polymerization solvent. Indeed, this implementation makes it possible to reduce the production cost since it does not require an expensive supplementary step of separating the solvents, and reduces the number of storage devices. According to this variant, the solvent having a boiling point below 40° C. allows an industrial process that is less expensive in terms of energy since the removal of the volatile solvent, once the polyisoprene has been synthesized, is facilitated by its low boiling point.

Another constituent element of the multicomponent catalytic system according to an embodiment of the invention is an alkylating agent. This alkylating agent consists of a trialkylaluminium, the alkyl radical being a $C_1$-$C_{10}$ radical. Thus, according to the invention, the alkylating agent is selected from trimethylaluminium, triethylaluminium, tri-n-propylaluminium, triisopropylaluminium, tri-n-butylaluminium, tri-t-butylaluminium, tri-n-pentylaluminium, tri-n-hexylaluminium, tri-n-octylaluminium, tricyclohexylaluminium.

According to an embodiment of the invention, the selection of these alkylating agents makes it possible to have a catalytic system in the form of a homogeneous and clear solution. The absence of insoluble particles greatly contributes to the reduction in costs by minimizing, or even by eliminating, the contribution of the catalytic system to deposits in the plant and to the fouling thereof. Indeed, the use, in a continuous process, of a cloudy catalyst solution leads in the end to a fouling of the pipework for injection of the catalytic system and of the production unit, and ultimately to the blockage of certain pipes or malfunction of certain devices such as flow rate control devices, filters, valves, gates and other pumps. The repeated passage of a non-homogeneous substance may lead to a fouling of these devices and to the blockage of certain pipes and ultimately to shutdowns of the production line which generally represent an additional cost for the implementation of the continuous process.

It has been demonstrated that triisobutylaluminium does not contribute to achieving the cost reduction objectives of an embodiment of the invention, and that it is therefore excluded from the alkylating agents.

According to one preferred implementation, the alkylating agent consists of trioctylaluminium.

According to an embodiment of the invention, it will be noted that the (alkylating agent/rare earth(s) salt) molar ratio in said catalytic system advantageously has a value ranging from 2 to 50, preferably from 3 to 30 and more probably still from 4 to 15.

The last constituent element of the multicomponent catalytic system according to the invention is a halogen donor. Among these donors, mention may be made of alkylaluminium halides. Mention may be made in this regard of alkylaluminium monohalides and dihalides and mixtures thereof, in particular diethylaluminium chloride, diethylaluminium bromide and ethylaluminium dichloride. Diethylaluminium chloride is more particularly preferred.

According to the process in accordance with an embodiment of the invention, it will be noted that the (halogen donor/rare earth salt) molar ratio may have a value ranging from 0.5 to 5, preferably from 2 to 3.8 and more preferably still from 2.5 to 3.2.

Embodiments of the invention consist of combinations of the various aspects described above and in particular the combinations of the preferred aspects. Thus, one embodiment of the invention is a multicomponent catalytic system, as defined above, which fulfils at least one of the following four conditions and preferably all four:

the rare earth(s) salt is a neodymium organophosphate, preferably neodymium tris[bis(2-ethylhexyl)phosphate];
the inert hydrocarbon solvent is an alkane, preferably n-pentane;
the alkylating agent is trioctylaluminium; and,
the halogen donor is an alkylaluminium halide, preferably diethylaluminium chloride.

Another subject of the invention is the preparation of the catalytic system described above. The catalytic system according to the invention may be preformed prior to said polymerization reaction, i.e. by bringing all of the various constituents of the catalytic system into contact with one another, including the preforming isoprene, in one or more steps, for a given time, generally of between 0 and 120 minutes at a temperature ranging from 10° C. to 80° C., then, simultaneously or sequentially, preforming the catalytic system for a time of between 0 and 120 minutes at a temperature ranging from 10° C. to 80° C. The term "preforming" is understood to mean halogenating via the addition of the halogen donor and ageing of the catalytic system.

Next, the resulting catalytic system is brought into contact with the isoprene to be polymerized in the volatile solvent.

The preformed catalytic system in accordance with an embodiment of the invention may be prepared batchwise. It may also be prepared continuously according to the process described in patent document WO-A-2007/045417.

According to one variant of the invention, the preparation of the catalytic system comprises an alkylation phase, namely a step of alkylating the rare earth(s) salt, in the presence or absence of the preforming isoprene, prior to being brought into contact with the halogen donor, a halogenation step. The alkylation step takes place at a controlled temperature ranging from 25° C. to 80° C. and preferably from 25° C. and 35° C.° C. and for a minimum characteristic time of at least 5 min and which, advantageously, ranges from 10 min to 60 min and preferably from 10 min to 20 min.

This variant is very particularly preferred in the continuous preparation of the catalytic system according to which the alkylation step is carried out in an alkylation reactor provided for this purpose. For the implementation of this variant, the alkylating agent is advantageously selected from trimethylaluminium, triethylaluminium, tri-n-propylaluminium, triisopropylaluminium, tri-n-butylaluminium, tri-t-butylaluminium, tri-n-pentylaluminium, tri-n-hexylaluminium, tri-n-octylaluminium, tricyclohexylaluminium, preferably tri-n-octylaluminium. Thus, the nature of the solution before halogenation of the catalytic system makes it possible to prevent any phenomenon of fouling of the alkylation reactor and of the pipework for injection into the halogenation reactor, which is unacceptable in particular in a continuous process.

According to a first order of addition of the constituents of the preformed catalytic system according to the invention, these are added as follows: in a first step, the alkylating agent of trialkylaluminum type is added to the solvent of the catalytic system according to the invention; in a second step, the rare earth(s) salt is then added; next, in a third step, the preforming isoprene is added and in a last step the halogen donor is added.

According to a second order of addition of the constituents of the preformed catalytic system according to the invention, these are added as follows: in a first step, the rare earth(s) salt is added to the solvent of the catalytic system; in a second step, the alkylating agent of trialkylaluminum type is added; next, in a third step, the preforming isoprene is added and in a last step the halogen donor is added.

According to another order of addition of the constituents of the preformed catalytic system according to an embodiment of the invention, these are added as follows: in a first step, the rare earth(s) salt is added to the solvent of the catalytic system; in a second step, the preforming isoprene is added; next, in a third step, the alkylating agent of trialkylaluminum type is added and in a last step the halogen donor is added.

By way of example, the preforming isoprene, a rare earth salt solution and the alkylating agent are brought into contact in the solvent of the catalytic system at 30° C. for 15 minutes, then the halogen donor is added to the preceding constituents and brought into contact at 60° C. for 50 minutes, next the resulting catalytic system solution is added to the monomer to be polymerized dissolved in the volatile polymerization solvent.

Another subject of the invention is a process for preparing polyisoprene having a high content of cis-1,4 linkages using the catalytic system described above.

This process according to an embodiment of the invention consists in reacting the monomer(s) to be polymerized in the presence of the catalytic system described above in order to obtain a polyisoprene which may be any homopolymer or copolymer obtained by homopolymerization of isoprene or copolymerization of the isoprene with at least one other conjugated diene monomer having from 4 to 12 carbon atoms. As conjugated diene monomer, 1,3-butadiene is in particular suitable. Preferably, said polyisoprene is selected from the group consisting of synthetic polyisoprenes (IR) and butadiene-isoprene copolymers (BIR).

The synthetic polyisoprenes according to the invention have, in the isoprene part, a high molar content of cis-1,4 linkages of greater than 96%, which may reach values of greater than 97%, with a molar content of trans-1,4 linkages of less than 1.6%.

The polymerization may be carried out in a manner known per se, continuously or batchwise. The polymerization is generally carried out at temperatures between −30° C. and 100° C. and preferably from 0° C. to 100° C. The temperature may be kept constant throughout the process or may be variable, depending on the targeted features of the elastomer synthesized.

The polymerization process may be carried out in solution, in a more or less concentrated or diluted medium. It is also possible to envisage the use of the catalytic system according to an embodiment of the invention for the bulk polymerization of isoprene, namely in the absence of a polymerization solvent.

With a view to reducing the energy cost of the industrial process for preparing polyisoprene when the polymerization is carried out in solution, the polymerization is carried out in the presence of a volatile inert hydrocarbon solvent, i.e. having a boiling point below 40° C., which may be, for example, an aliphatic or alicyclic hydrocarbon having at most 5 carbon atoms. Indeed, the step of recovering the synthesized polymer is facilitated by its low boiling point. In this regard, mention may be made of C5 light alkanes such as n-pentane, 2-methylbutane, 2,2-dimethylpropane or a mixture of these solvents. Mention may also be made of other aliphatic, unsaturated C5 inert hydrocarbon solvents such as 1-pentene, 2-pentene, 2-methylbut-1-ene, 3-methylbut-1-ene, 2-methylbut-2-ene, or a mixture of these solvents. As polymerization solvent, it is preferred to use an alkane, more preferably n-pentane.

Particularly advantageously, the polymerization solvent is identical to the solvent of the catalytic system for the cost reduction reasons mentioned above in connection with the solvent of the catalytic system.

According to one particularly advantageous variant for an industrial application, the isoprene polymerization process is carried out continuously in a highly concentrated medium (bulk and semi-bulk polymerization). It is referred to as polymerizing in a highly concentrated medium when the amount of solvent represents from 0% to 70% by weight with respect to the total weight of monomer(s) and solvent. The amount of solvent may, for example, be at least 10% by weight, or even at least 30% by weight, and at most 60% by weight, or even at most 55% by weight of the total weight of monomer(s) and solvent.

According to this variant, the polymerization is carried out until a degree of conversion of at least 60% is achieved at the limit of the first third of the reaction volume of the polymerization reactor sized so that the standard deviation of the residence time distribution function in said reactor is greater than the mean residence time divided by $2\sqrt{3}$. The polymerization medium is stirred by the continuous movement of at least one stirrer about a rotary axis.

This limiting degree of conversion of 60%, associated with the specific feature relating to the residence time distribution function of the invention, is, within the context of this variant of continuous polymerization of isoprene in a highly concentrated medium, essential for overcoming the formation of foam and preventing the phenomenon of expansion of the reaction medium. Indeed, below 60% and without satisfying the condition relating to the residence time distribution function of an embodiment of the invention, the formation of bubbles is observed which rapidly leads to an uncontrollable expansion of the reaction medium. In order to achieve this necessary degree of conversion of at least 60%, a person skilled in the art has many technical levers or means that he can vary in a multitude of combinations. Among these various technical levers, mention may be made of the reaction temperature, the concentration of monomer in the reaction medium, the concentration of polymerization catalyst or initiator in the reaction medium, the mean residence time, etc. The means to be implemented in order to achieve at least 60% conversion at the limit of the first third of the reaction volume of the polymerization reactor are within the scope of the person skilled in the art. The simple instruction to achieve a minimum conversion limit, in this case at least 60% at the limit of the first third of the reaction volume of the polymerization reactor, constitutes for a person skilled in the art an indication of the combinations of means to be implemented in order to carry out this instruction.

The degree of conversion may be determined in various ways known to a person skilled in the art. For example, the degree of conversion may be determined from a measurement made on a sample withdrawn at the limit of the first third of the reaction volume of the polymerization reactor, for example by gas chromatography (GC). The concentration of residual monomer(s) (not converted in the sample) is measured. From the difference between the concentration of the monomer(s) introduced into the polymerization reactor ($C_i$) and the concentration of residual monomer(s) measured in the sample withdrawn ($C_r$), the degree of conversion as a weight percentage is determined as being:

$$X \text{ wt } \% = 100 * \left[ \frac{(C_i - C_r)}{C_i} \right]$$

with:

X wt %: degree of conversion as a weight percentage;
$C_i$: concentration of the monomer(s) introduced into the polymerization reactor;
$C_r$: concentration of the residual monomer(s) measured in the sample withdrawn; preferably, this degree of conversion at the first third of the polymerization reactor is at least 70% and more preferably still from 80% to 100%, for an increasing productivity.

The other essential feature for this advantageous variant relates to the flow conditions in the reactor during the polymerization reaction. The characterization of these flows by a residence time distribution function is such that the standard deviation of the residence time distribution function is greater than the mean residence time divided by 2√3. More particularly, the standard deviation of the residence time distribution function is greater than the mean residence time divided by 2. The residence time distribution function in the polymerization reactor may be determined in a manner known per se by a person skilled in the art. For example, it may be determined by modelling the experimental points obtained by measuring, via gas chromatography, the changes in concentration of a tracer at the outlet of the reactor, following a very rapid injection, of this tracer, according to a pulsed method of introducing a chemically inert product according to the principle described in the book *Jacques Villermaux, Génie de la reaction chimique: conception et fonctionnement des reacteurs* [*Chemical reaction engineering: design and operation of reactors*], published in 1993 by TEC & DOC—LAVOISIER, pages 170 to 172.

The combination of these two conversion and flow features makes it possible to have a process for synthesizing polyisoprene, in a highly concentrated medium, in the presence of a volatile solvent where appropriate, and that is continuous, having an increased productivity, and a remarkable flexibility due to the absence of expansion.

Still according to this advantageous variant, the polymerization reactor is provided with a gas phase and equipped with at least one stirrer and a discharge device. The stirrer enables continuous stirring of the reaction medium. It may be of varied shape and is adapted to the technology of the reactor. Many types may be found commercially. By way of example, the stirrer may be a sigma (or Z) blade or another type of blade as described in the work by David B. Todd, Mixing of Highly Viscous Fluids, Polymers, and Pastes, in Handbook of Industrial Mixing: Science and Practice, edited by E. L. Paul, V. A. Atiemo-Obeng, and S. M. Kresta, 2004, John Wiley and Sons, page 998, page 1021.

According to preferred configurations, the polymerization reactor is more particularly of Z-arm kneader technology. The expression "Z-arm kneader technology" is understood more particularly to mean a mixer or kneader formed from a vessel equipped with two Z arms, each moved independently or not about a preferably horizontal rotary axis. The two Z arms are then preferably counter-rotated so as to feed the drainage device at the bottom of the vessel.

By way of example, this reactor in accordance with the invention is sold under various names such as:
sigma blade mixers-discharge screw type, sold by Battaggion SPA,
extrusion-kneaders, sold by Aachener Misch- and Knetmaschinenfabrik Peter Küpper GmbH & Co. KG,
double-Z-kneaders with extrusion screw, sold by Hermann Linden Maschinenfabrik GmbH & Co. KG,
mixer-extruders, sold by Aaron Process Equipment Company.

The polymerization reactor is provided with a gas phase that enables the removal of the heat of polymerization by vaporization of a portion of the reaction medium. The volume ratio of the gas phase to the reaction medium depends on the type of reactor used and the determination thereof is within the scope of a person skilled in the art. The polymerization reactor is also provided with a discharge device completely or partially integrated into the polymerization reactor, such as a withdrawal device with gears or screws, positioned at the bottom or on the side of the reactor.

At the end of the continuous polymerization step, the process may be continued in a manner known per se.

According to one implementation of the invention, the continuous polymerization process incorporates the steps of the continuous preparation process of the catalytic system in particular as described in patent document WO-A-2007/045417 in all aspects thereof, preferred or otherwise, in particular the step of alkylation before halogenation and ageing.

According to other embodiment variants of the catalytic polymerization process in accordance with an embodiment of the invention, it is possible to introduce into the polymerization reactor, independently of the introduction of the catalytic system used for the polymerization reaction, a predetermined supplementary amount of at least one alkylaluminium compound of formula $AlR_3$ or $HAlR_2$ or $R''_nAlR'_{3-n}$, which R, R' and R'' represent a saturated or unsaturated alkyl group having from 1 to 20 carbon atoms, preferably from 1 to 12 carbon atoms, n is an integer inclusively from 1 to 3 and H represents a hydrogen atom. Such variants are described in particular in documents WO 2006/133757, EP 1 845 118, WO 10/069511, WO 10/069805. The introduction is carried out in the polymerization reactor when operating batchwise or in the polymerization unit when it operates continuously, in a staggered manner with respect to the catalytic system used for the polymerization reaction, that is to say not at the same time and, consequently, either before, or after, or partly before and partly after, with respect to the introduction of the catalytic system used for initiating the polymerization reaction.

According to one advantageous implementation of this polymerization process variant, the alkylaluminium compound is different from the trialkylaluminium compound used to prepare the catalytic system.

According to another implementation of this polymerization process variant, the alkylaluminium compound is identical to the trialkylaluminium compound used to prepare the catalytic system.

As alkylaluminium compound, mention may be made of alkylaluminiums such as:
trialkylaluminiums such as for example trimethylaluminium, triethylaluminium, tri-n-propylaluminium, triisopropylaluminium, tri-n-butylaluminium, tri-t-butylaluminium, triisobutylaluminium, tri-n-pentylaluminium, tri-n-hexylaluminium, tricyclohexylaluminium, preferably triisobutylaluminium or
dialkylaluminium hydrides such as for example diethylaluminium hydride, diisopropylaluminium hydride, di-n-propylaluminium hydride, diisobutylaluminium hydride, di-n-octylaluminium hydride, di-n-butylaluminium hydride, preferably diisobutylaluminium hydride.

Advantageously, the (alkylaluminium compound added in a staggered manner/trialkylaluminium in the catalytic system) molar ratio varies from 1/20 to 50/1, preferably varies from 1/15 to 30/1 and more preferably still from 1/10 to 20/1.

It will be noted that the addition of the alkylaluminium compound before polymerization makes it possible to be free of the fluctuations over time of the impurities due to the solvents and to the monomers injected at the line inlet and not to adversely affect, due to these fluctuations, the activity of the catalytic system. This embodiment variant of the invention thus makes it possible to minimize the dispersion of the features of the elastomer obtained. According to certain implementations, the amount of said alkylaluminium compound previously brought into contact with the monomer(s) to be polymerized, at least isoprene, varies from 10 to 5000 micromoles per 100 g of monomer(s) to be polymerized, as a function of the amount of impurities present in the polymerization medium, such as impurities originating from recycled solvents.

It will be understood that a combination of the addition of an alkylaluminium compound before polymerization and of the continuous embodiment variant of the process for synthesizing isoprene in a highly concentrated medium described above constitutes a particularly advantageous variant for the industrial implementation of a continuous process.

This particularly advantageous variant can be combined with all of the variants and implementations, preferred or otherwise, described above in particular in connection with the composition and the preparation of the catalytic system.

Advantageously, and in comparison with a process using a catalytic system as described for example in documents WO-A-02/38636, WO-A-03/097708 and WO-A-2007/045417, the process according to an embodiment of the invention makes it possible to obtain, with an equivalent catalytic activity, a polyisoprene characterized by a high content of cis-1,4 units, while retaining the advantages of a polymerization in a volatile solvent.

This elastomer may for example consist of a polyisoprene (IR) or of a butadiene and isoprene copolymer (BIR).

It will be noted that the catalytic systems used in the process according to an embodiment of the invention make it possible in particular to obtain isoprene homopolymers (IR) having a content of cis-1,4 linkages (measured by the near infrared "NIR" assay technique, explained below) which is greater than 96%, or even of at least 97%, which may be described as a high content of cis-1,4 units.

The aforementioned features of embodiments of the present invention, and others, will be better understood on reading the following description of several exemplary embodiments of the invention, given by way of illustration and non-limitingly.

MEASUREMENT METHODS

Determination of the Microstructure of the Polyisoprenes Obtained

The "near infrared" (NIR) assay technique was used. This is an indirect method that requires "control" elastomers, the microstructure of which has been measured by the $^{13}C$ NMR technique. Use is made of the quantitative relationship (Beer-Lambert law) that exists between the distribution of the monomers in an elastomer and the shape of the NIR spectrum thereof. This technique is carried out in two steps:
1) Calibration:
The respective spectra of the "control" elastomers are acquired.
A mathematical model is established that associates a microstructure with a given spectrum, this with the aid of the PLS (Partial Least Squares) regression method that is based on a factorial analysis of the spectral data. The two documents below deal, in an in-depth manner, with the theory and implementation of this method of analysing "multivariate" data:
(1) P. GELADI and B. R. KOWALSKI
"Partial Least Squares regression: a tutorial",
Analytica Chimica Acta, vol. 185, 1-17 (1986).
(2) M. TENENHAUS
"La régression PLS—Théorie et pratique" [PLS regression—Theory and practice] Paris, Editions Technip (1998).
2) Measurement:
The spectrum of the sample is recorded.
The microstructure is calculated.

Determination of the Distribution of the Molar Masses of the Polyisoprenes Obtained by the Size Exclusion Chromatography (SEC) Technique.

a) Measurement Principle:

Size exclusion chromatography or SEC makes it possible to separate the macromolecules in solution according to their size through columns filled with a porous gel. The macromolecules are separated according to their hydrodynamic volume, the bulkiest being eluted first.

Without being an absolute method, SEC makes it possible to understand the distribution of the molar masses of a polymer. From commercial standard products, the various number-average molar masses (Mn) and weight-average molar masses (Mw) may be determined and the polymolecularity index (Ip=Mw/Mn) calculated via a Moore calibration.

b) Polymer Preparation:

There is no particular treatment of the polymer sample before analysis. The latter is simply dissolved in tetrahydrofuran at a concentration of around 1 g/l.

c) SEC Analysis:

Case c1) The apparatus used is a "Waters alliance" chromatographic chain. The elution solvent is tetrahydrofuran, the flow rate is 1 ml/min, the temperature of the system is 35° C. and the analysis time is 30 min. A set of two Waters columns of "Styragel HT6E" trade name is used.

The injected volume of the solution of polymer sample is 100 μl. The detector is a "Waters 2140" differential refractometer and the software for processing the chromatographic data is the "Waters Millenium" system.

Case c2) The apparatus used is a "Waters alliance" chromatographic chain. The elution solvent is tetrahydrofuran, the flow rate is 0.7 ml/min, the temperature of the system is 35° C. and the analysis time is 90 min. A set of four Waters columns in series, of "Styragel HMW7", "Styragel HMW6E" and two "Styragel HT6E" trade names, is used.

The injected volume of the solution of polymer sample is 100 μl. The detector is a "Waters RI32X model" differential refractometer and the software for processing the chromatographic data is the "Waters Millenium" system.

Determination of the Inherent Viscosity.

The inherent viscosity $\eta_{inh}$ is measured at 25° C. at 0.1 g/dl in toluene and characterizes the macrostructure of the elastomer.

The viscosity is calculated from the formula:

$$\eta = \frac{1}{C} \times \ln\left(\frac{T_1}{T_2}\right)$$

with η being the inherent viscosity (dl/g), C being the concentration of polymer in toluene (g/dl), $T_1$ being the flow time of the polymer solution (hundredth of a minute) and $T_2$ being the flow time of the toluene (hundredth of a minute).

EXAMPLES

Definitions of Abbreviations Used in the Examples
Nd=neodymium
Bd=butadiene
Isop=isoprene
MCH=methylcyclohexane
HDiBA=diisobutylaluminium hydride
TOA=trioctylaluminium
CDEA=diethylaluminium chloride
TiBA=triisobutylaluminium
Synthesis of Batchwise "Control" Catalysts Prepared in a "Heavy" Solvent:

The control catalyst is the Nd/Bd/HDiBA/CDEA system according to the invention WO-A-02/38636 in the name of the Applicant companies. In order to obtain this control catalyst, neodymium phosphate salt in powder form is introduced into a previously washed and oven-dried 250 ml "Steinie" bottle. This bottle is then sealed with the aid of a rubber septum and a perforated cap. The salt is then subjected to nitrogen sparging for 10 min for the purpose of rendering the reaction medium inert. The following successive steps are then carried out:

Solvation First Step:

A solvent consisting of MCH previously distilled, purified over alumina and sparged with nitrogen is introduced into the "Steinie" bottle. In order to form a gel, the time and temperature for bringing this solvent and the neodymium salt into contact are 10 h at ambient temperature.

Monomer Addition Second Step:

Butadiene previously purified over alumina and sparged with nitrogen is then introduced into the "Steinie" bottle at ambient temperature. This monomer will be used to preform the catalyst during the ageing step.

Alkylation Third Step:

HDiBA in solution in MCH is then introduced into the "Steinie" bottle as alkylating agent for the neodymium salt, at a concentration of around 1 mol/l. The alkylation time is 15 min. The temperature of the alkylation reaction is equal to 30° C.

Halogenation Fourth Step:

CDEA in solution in MCH is then introduced into the "Steinie" bottle as halogen donor, at a concentration of around 0.5 mol/l. The temperature of the reaction medium is brought to 60° C.

Ageing Fifth Step:

The mixture thus obtained is aged by maintaining the temperature of 60° C. for a time of 50 min.

The catalytic solution obtained is finally stored under a nitrogen atmosphere at a temperature of between −15° C. and −5° C.

The catalysts are characterized by their catalytic formula, which is given in the form Nd/monomer/alkylating agent/halogenating agent as molar ratios linked to the neodymium salt. In the examples, their neodymium concentration is 0.02 mol/l.

Synthesis of Batchwise Catalysts According to the Invention Prepared in a Volatile Solvent:

The catalysts according to an embodiment of the invention are of formula Nd/Isop/TOA/CDEA diluted in n-pentane.

In order to obtain this catalyst, neodymium phosphate salt in powder form is introduced into a previously washed and oven-dried 250 ml "Steinie" bottle. This bottle is then sealed with the aid of a rubber septum and a perforated cap. The salt is then subjected to nitrogen sparging for 10 min for the purpose of rendering the reaction medium inert. The following successive steps are then carried out:

Solvation First Step:

A solvent consisting of n-pentane previously purified over alumina and sparged with nitrogen is introduced into the "Steinie" bottle. In order to form a gel, the time and temperature for bringing this solvent and the neodymium salt into contact are 10 h at ambient temperature.

Monomer Addition Second Step:

Isoprene previously purified over alumina and sparged with nitrogen is then introduced into the "Steinie" bottle at ambient temperature. This monomer will be used to preform the catalyst during the ageing step.

Alkylation Third Step:

TOA in solution in n-pentane is then introduced into the "Steinie" bottle as alkylating agent for the neodymium salt, at a concentration of around 1 mol/l. The alkylation time is 15 min. The temperature of the alkylation reaction is equal to 30° C.

Halogenation Fourth Step:

CDEA in solution in n-pentane is then introduced into the "Steinie" bottle as halogen donor, at a concentration of around 0.5 mol/l. The temperature of the reaction medium is brought to 60° C.

Ageing Fifth Step:

The mixture thus obtained is aged by maintaining the temperature of 60° C. for a time of 50 min.

The catalytic solution obtained is finally stored under a nitrogen atmosphere at a temperature of between −15° C. and −5° C.

The catalysts are characterized by their catalytic formula, which is given in the form Nd/monomer/alkylating agent/halogenating agent as molar ratios linked to the neodymium salt. In the examples, the neodymium concentration of the batchwise catalysts is 0.02 mol/l.

Other catalysts are described in the examples and in Table(s) 1 to 3 below and differ due to the nature of the various constituents and due to their preparation solvent. The procedure for the preparation of these other catalysts is identical to those described above.

The appearance, in particular the solubility of the various catalytic solutions prepared, was evaluated visually. The homogeneous catalysts were then tested by polymerization of isoprene in accordance with the procedures described below.

Procedure Followed for the Batchwise Polymerizations

The polymerization is carried out for these examples in 250 ml "Steinie" bottles, the sealing of which is ensured by a "seal/pierced cap" assembly allowing the reactants to be injected using syringes. The polymerization is carried out with a solvent/monomer weight ratio in an inert nitrogen atmosphere equal to 5.8. It is carried out with stirring and with a temperature hold in a thermoregulated water bath.

The diene monomer to be polymerized (i.e. isoprene) and also the polymerization solvent (i.e. n-pentane) are previously purified over alumina and sparged with nitrogen.

Introduced into a 250 ml "Steinie" bottle previously sparged with nitrogen are 88 ml (55 g) of n-pentane, to which 9.5 g of isoprene are added. The alkylaluminium pre-added to the polymerization medium, where appropriate, is then injected with a syringe in the form of a solution at around 0.2 mol/l in n-pentane, followed by the catalyst in the amounts indicated in the tables below. The bottle is then stirred at 50° C. for a given time. 1 ml of methanol is then added in order to stop the reaction and, next, 1 ml of a 20 g/l solution of N-1,3-dimethylbutyl-N'-phenyl-paraphenylenediamine intended to act as an antioxidant for the polyisoprene is finally added.

Procedure Followed for the Continuous Polymerizations

The continuous polymerization is carried out on a line comprising a double Z-arm, gas-phase reactor of 150 litres in total, equipped with a discharge device with a drain screw and a gear pump.

Isoprene and n-pentane are premixed in a dynamic mixer upstream of the polymerization reactor. The isoprene is injected with a flow rate of 9.28 kg/h into the mixer and the pentane is injected with a flow rate of 10.84 kg/h. A concentrated solution of alkylaluminium at around 0.3 mol/l in n-pentane is also introduced into the dynamic mixer. The mixture of these 3 streams obtained at the outlet of the dynamic mixer is injected directly into the reactor. The catalyst is injected as a separate and independent stream directly into the reactor. The concentration of monomer at the inlet of the reactor is around 45 wt %. The pressure of the gas phase is regulated at 0.5 barg.

The mean residence time of the reaction is 80 minutes.

The discharge screw makes it possible to transfer the product from the reactor to a gear pump.

0.5 phm (phm: parts by weight per 100 parts by weight of isoprene monomer) of N-1,3-dimethylbutyl-N'-phenyl-paraphenylenediamine, acting as chain stopper and antioxidant is injected at the outlet of the reactor upstream of the gear pump.

The gear pump transfers the elastomer paste to an underwater pelletizer. The flow transferred by the gear pump is equal to the sum of the flows entering the reactor, to which the stopper and antioxidant flows are added. The process then continues, in a manner known per se, with the separation and recovery of the diene elastomer prepared.

No expansion phenomenon is observed.

The conversion measured on a withdrawn sample, at the limit of the first third of the reactor volume is 77%. The conversion measurement was established from a GC measurement of the isoprene in the sample withdrawn. The residual isoprene, in the sample withdrawn, was assayed at 10 wt %.

The flows are characterized by the residence time distribution given by the FIGURE.

The experimental points that make it possible to establish this residence time distribution were obtained by measuring, via gas chromatography, the changes in concentration of a tracer following a very rapid injection according to a pulsed method of introducing a chemically inert product according to the principle described in the book *Jacques Villermaux, Genie de la reaction chimique: conception et fonctionnement des réacteurs* [*Chemical reaction engineering: design and operation of reactors*], published in 1993 by TEC & DOC—LAVOISIER, pages 170 to 172. The experimental points are derived from sample withdrawals taken at the outlet of the reactor, at the end of the drain screw.

Modelling of these experimental points with a gamma distribution has made it possible to determine the variance of the residence time distribution function E.

The gamma distribution for modelling the residence time distribution function E is the following:

$$E = \frac{t^{k-1} * e^{\frac{-t}{t_0}}}{\Gamma(k) t_0^k}$$

with:
$\Gamma(k)$: gamma function of k;
k: constant;
$t_0$: mean residence time, i.e. 80 minutes;
t: residence time.

The variance of this residence time distribution function is equal to $k * t_0^2$. Fitting the function to the experimental points makes it possible to determine the parameter k, which is equal to 1.22

The standard deviation of the residence time distribution function is deduced therefrom, which is equal to 88.4, which is greater than the mean residence time divided by $2\sqrt{3}$, i.e.

$$\frac{t_0}{2\sqrt{3}} = \frac{80}{2\sqrt{3}} = 23.1.$$

Presentation of the Tests

Table 1 presents the solubility in the volatile alkanes of various catalysts according to their catalytic formula. They were prepared batchwise according to the procedure described above.

TABLE 1

Solubility of the catalysts in volatile alkanes

| Test | Catalyst reference | Catalytic formula | Stoichiometry | Dilution solvent | Visual appearance* after alkylation | Visual appearance* after ageing |
|---|---|---|---|---|---|---|
| 1 | A | Nd/Bd/HDiBA/CDEA | 1/30/1.8/2.8 | MCH | 1 | 1 |
| 2 | B | Nd/Bd/HDiBA/CDEA | 1/30/8/2.8 | MCH | 1 | 1 |
| 3 | C | Nd/Bd/HDiBA/CDEA | 1/30/1.8/2.6 | n-pentane | 1 | 3 |
| 4 | D | Nd/Bd/HDiBA/CDEA | 1/20/1.8/2.6 | n-pentane | 1 | 3 |
| 5 | E | Nd/Bd/HDiBA/CDEA | 1/10/1.8/2.6 | n-pentane | 1 | 3 |
| 6 | F | Nd/Bd/HDiBA/CDEA | 1/30/1.8/2.6 | Isopentane | 1 | 3 |
| 7 | G | Nd/Bd/HDiBA/CDEA | 1/20/1.8/2.6 | Isopentane | 1 | 3 |
| 8 | H | Nd/Bd/TiBA/CDEA | 1/30/8/2.8 | n-pentane | 3 | 3 |
| 9 | I | Nd/Bd/TOA/CDEA | 1/30/8/2.8 | n-pentane | 1 | 3 |
| 10 | J | Nd/Isop/HDiBA/CDEA | 1/30/1.8/2.8 | n-pentane | 1 | 1 |
| 11 | K | Nd/Isop/HDiBA/CDEA | 1/30/8/2.8 | n-pentane | 1 | 1 |
| 12 | L | Nd/Isop/TiBA/CDEA | 1/30/4/2.6 | n-pentane | 3 | 2 |
| 13 | M | Nd/Isop/TOA/CDEA | 1/30/4/2.8 | n-pentane | 1 | 1 |
| 14 | N | Nd/Isop/TOA/CDEA | 1/30/5/2.8 | n-pentane | 1 | 1 |
| 15 | O | Nd/Isop/TOA/CDEA | 1/30/7/2.8 | n-pentane | 1 | 1 |
| 16 | P | Nd/Isop/TOA/CDEA | 1/30/8/2.8 | n-pentane | 1 | 1 |

*Visual assessment: (1): Clear and homogeneous; (2) Cloudy/turbid, presence of solid particles; (3) heterogeneous and phase-separated at ambient temperature Butadiene-Based Catalysts:

Tests 1 and 2 are control catalysts. In these examples, the catalysts A and B of formula Nd/Bd/HDiBA/CDEA are synthesized in MCH respectively according to the invention described in WO 02/38636 and WO 2003/097708 in the name of the Applicant companies. Under these synthesis conditions, the catalysts obtained are homogeneous and clear.

Tests 3 to 5 show that the use of n-pentane as solvent for preparation of the catalytic system of formula Nd/Bd/HDiBA/CDEA does not make it possible to obtain homogeneous catalysts, even by modifying the amount of pre-forming conjugated diene, i.e. the length of the prepolymer.

Tests 6 and 7 show that the use of isopentane as solvent for preparation of the catalytic system of formula Nd/Bd/HDiBA/CDEA does not make it possible to obtain homogeneous catalysts, even by modifying the amount of pre-forming conjugated diene, i.e. the length of the prepolymer.

Tests 8 and 9 show that the use of n-pentane as solvent for preparation of the catalytic system Nd/Bd/AlR$_3$/CDEA does not make it possible to obtain homogeneous catalysts, even by changing the nature of the alkylating agent (replacement of a dialkylaluminium hydride with a trialkylaluminium).

It is not therefore possible to dilute a catalyst of formula Nd/Bd/HAlR$_2$ or AlR$_3$/CDEA in a volatile alkane, the boiling point of which is below 40° C. at atmospheric pressure, such as C5 alkanes.

Isoprene-Based Catalysts:

Tests 10 and 11 show that replacing butadiene with isoprene in a preformed catalytic system of formula Nd/Bd/HDiBA/CDEA makes it possible to obtain a homogeneous and clear catalyst.

Tests 12 to 16 show that, depending on the nature of the alkylating agent, it is not systematically possible to obtain a preformed catalytic system of Nd/Isop/AlR$_3$/CDEA type that is homogeneous and clear.

In the remainder of the examples, the homogeneous and soluble catalysts obtained above were used in batchwise polymerization of isoprene according to the procedure described above. The results are reported in Table 2.

TABLE 2

Polymerization test of homogeneous batchwise catalysts

| Test | Notation | Catalyst reference | Catalytic formula | Stoichiometry | Solvent | Alkylaluminium pre-added (µmolhm) | Nd concentration (µmolhm) | Conversion after 30 minutes (%) | Activity* |
|---|---|---|---|---|---|---|---|---|---|
| 17 | Control 1 | A | Nd/Bd/HDiBA/CDEA | 1/30/1.8/2.8 | MCH | None | 202 | 66 | = |
| 18 | Control 2 | A | Nd/Bd/HDiBA/CDEA | 1/30/1.8/2.8 | MCH | HDiBA (181) | 202 | 79 | = |
| 19 | C-Ex 1 | B | Nd/Bd/HDiBA/CDEA | 1/30/8/2.8 | MCH | None | 202 | 58 | — |
| 20 | C-Ex 2 | B | Nd/Bd/HDiBA/CDEA | 1/30/8/2.8 | MCH | HDiBA (181) | 202 | 58 | — |
| 21 | C-Ex 3 | J | Nd/Isop/HDiBA/CDEA | 1/30/1.8/2.8 | Pentane | HDiBA (181) | 202 | 66 | — |
| 22 | C-Ex 4 | K | Nd/Isop/HDiBA/CDEA | 1/30/8/2.8 | Pentane | HDiBA (181) | 202 | 68 | — |
| 23 | Ex 1 | N | Nd/Isop/TOA/CDEA | 1/30/5/2.8 | Pentane | TIBA (400) | 202 | 99 (60') | = |
| 24 | Ex 2 | N | Nd/Isop/TOA/CDEA | 1/30/5/2.8 | Pentane | TIBA (800) | 202 | 99 (60') | = |
| 25 | Ex 3 | N | Nd/Isop/TOA/CDEA | 1/30/5/2.8 | Pentane | TIBA (1500) | 202 | 99 (60') | = |
| 26 | Ex 4 | O | Nd/Isop/TOA/CDEA | 1/30/7/2.8 | Pentane | TIBA (923) | 202 | 86 | = |
| 27 | Ex 5 | N | Nd/Isop/TOA/CDEA | 1/30/5/2.8 | Pentane | TOA (510) | 202 | 95 (60') | = |
| 28 | Ex 6 | N | Nd/Isop/TOA/CDEA | 1/30/5/2.8 | Pentane | TOA (860) | 202 | 95 (60') | = |
| 29 | Ex 7 | N | Nd/Isop/TOA/CDEA | 1/30/5/2.8 | Pentane | TOA (1550) | 202 | 95 (60') | = |
| 30 | Ex 8 | P | Nd/Isop/TOA/CDEA | 1/30/8/2.8 | Pentane | None | 202 | 72 | = |
| 31 | Ex 9 | P | Nd/Isop/TOA/CDEA | 1/30/8/2.8 | Pentane | HDIBA (181) | 202 | 82 | = |

µmolhm: µmol per 100 g of monomer to be polymerized
* (=) catalytic activity in accordance with the control catalyst; (—) reduced activity with respect to the control catalyst Tests 17 and 18 are control tests carried out with the catalyst A of formula Nd/Bd/HDiBA/CDEA synthesized in MCH according to the invention WO 02/38636 in the name of the Applicant companies. Unlike test 17, an alkylaluminium is pre-added to the polymerization medium before the injection of the catalyst for test 18, according to the invention WO 2006/133757 A1 in the name of the Applicant companies.

Comparison of tests 18 and 21 shows that the use of isoprene as preforming monomer in the catalytic formula Nd/monomer/HDiBA/CDEA does not make it possible to obtain a catalyst as active as the Nd/Bd/HDiBA/CDEA control catalyst synthesized according to the invention WO 02/38636 in the name of the Applicant companies.

Comparison of tests 21 and 22 shows that the increase of the HDiBA/Nd ratio in the catalysts of formula Nd/Isop/HDiBA/CDEA does not enable a significant increase in activity and therefore does not make it possible to obtain an activity similar to that of a control catalyst of formula Nd/Bd/HDiBA/CDEA (test 18).

Comparison of tests 30 and 17 and also that of tests 31 and 18 show that the combination of isoprene and TOA results in catalysts of formula Nd/Isop/TOA/CDEA being obtained that have an activity at least equivalent to that of the Nd/Bd/HDiBA/CDEA control catalyst synthesized according to the invention WO-A-02/38636 in the name of the Applicant companies.

Table 3 presents the macrostructure and microstructure results of the polyisoprenes obtained during the batchwise polymerizations presented in Table 2.

according to the invention WO-A-02/38636 in the name of the Applicant companies, pre-adding HDiBA to the reaction medium enables a reduction in the viscosity, and therefore in the molecular masses, of the polyisoprene synthesized.

Comparison of tests 23 to 25 shows that with a catalyst of formula Nd/Isop/TOA/CDEA, pre-adding TIBA in variable amounts to the polymerization medium makes it possible to modify the viscosity, and therefore the molecular masses, of the polyisoprene synthesized.

Comparison of tests 30 and 31 shows that with a catalyst of formula Nd/Isop/TOA/CDEA, pre-adding HDiBA to the reaction medium enables a reduction in the viscosity, and therefore in the molecular masses, of the polyisoprene synthesized.

However it is observed, with tests 27 to 29, that the increase in the content of TOA pre-added has no impact on the viscosity of the polyisoprene synthesized with a catalyst of formula Nd/Isop/TOA/CDEA, or on the polymerization kinetics.

The homogeneous catalysts tested above may be synthesized batchwise or continuously. They may also be used in batchwise or continuous polymerization of isoprene.

Table 4 presents a continuous polymerization of isoprene, performed according to the procedure described above, carried out with a catalyst of formula Nd/Isop/TOA/CDEA also synthesized continuously at 0.04 mol/l according to the

TABLE 3

Characteristics of the polyisoprenes obtained during tests 17 to 31

| Test | Notation | Catalyst reference | Inherent viscosity (dl/g) | Mn (g/mol)/Ip | % cis-1,4 | % trans-1,4 | % 3,4 |
|---|---|---|---|---|---|---|---|
| 17 | Control 1 | A | 4.5 | 611000/2.26 | 98.4 | ND | 1.6 |
| 18 | Control 2 | A | 3.3 | 373000/2.28 | 98.4 | ND | 1.6 |
| 23 | Ex 1 | N | 5.8 | | | | |
| 24 | Ex 2 | N | 5.3 | | | | |
| 25 | Ex 3 | N | 4.5 | | | | |
| 26 | Ex 4 | O | 3.9 | 295000/2.51 | 97.3 | ND | 1.7 |
| 27 | Ex 5 | N | 6.2 | | | | |
| 28 | Ex 6 | N | 6.2 | | | | |
| 29 | Ex 7 | N | 6.2 | | | | |
| 30 | Ex 8 | P | 4.9 | 684700/2.31 | 97.3 | ND | 1.9 |
| 31 | Ex 9 | P | 4.5 | 534700/2.50 | 97.4 | ND | 1.8 |

ND: not detected, i.e. less than 1.6 mol %

Comparison of tests 17 and 18 shows that with the control catalyst of formula Nd/Bd/HDiBA/CDEA synthesized procedure described in patent document WO 2007/045417 A1.

TABLE 4

Continuous polymerization carried out with a continuous catalyst according to the invention

| Test | Notation | Catalyst reference | Catalytic formula | Stoichiometry | Solvent | Alkyl-aluminium pre-added (µmolhm) | Nd concentration (µmolhm) |
|---|---|---|---|---|---|---|---|
| 32 | EX 10 | Q | Nd/Isop/TOA/CDEA | 1/30/8/2.8 | pentane | TiBA (1320) | 40 |

| Test | Notation | Catalyst reference | Conversion after 80 minutes (%) | Inherent viscosity (dl/g) | Mn (g/mol)/Ip | % cis-1,4 | % trans-1,4 | % 3,4 |
|---|---|---|---|---|---|---|---|---|
| 32 | EX 10 | Q | 85 | 4.5 | 367700/3.17 | 97.8 | ND | 2.2 |

ND: not detected, i.e. less than 1.6 mol %

The invention claimed is:

1. A multicomponent catalytic system based at least:
   on isoprene, as preforming monomer;
   on a rare earth metal salt of an organic phosphoric acid, or on a rare earth metal salt of a carboxylic acid;
   on a saturated or unsaturated inert hydrocarbon solvent, the boiling point of which is below 40° C. at atmospheric pressure;
   on an alkylating agent consisting of a trialkylaluminium of formula $AlR_3$, in which R represents an alkyl radical having from 1 to 10 carbon atoms, selected from trimethylaluminium, triethylaluminium, tri-n-propylaluminium, triisopropylaluminium, tri-n-butylaluminium, tri-t-butylaluminium, tri-n-pentylaluminium, tri-n-hexylaluminium, tri-n-octylaluminium, tricyclohexylaluminium; and
   on a halogen donor consisting of an alkylaluminium halide, the alkyl radical having from 1 to 8 atoms; wherein this catalytic system comprises the rare earth metal in a concentration greater than or equal to 0.005 mol/l.

2. The catalytic system according to claim 1, wherein the rare earth metal is a lanthanide.

3. The catalytic system according to claim 1, wherein the rare earth metal salt of an organic phosphoric acid is an organophosphate of a phosphoric acid diester of general formula (R'O)(R"O)PO(OH), wherein R' and R", which are identical or different, represent a saturated or unsaturated C1-C10 alkyl radical, a C6-C12 aryl radical or a C7-C22 alkylaryl radical.

4. The catalytic system according to claim 3, wherein the rare earth metal salt is a rare earth tris[bis(2-ethylhexyl) phosphate].

5. The catalytic system according to claim 1, wherein the (alkylating agent/rare earth salt) molar ratio has a value ranging from 3 to 30.

6. The catalytic system according to claim 1, wherein it comprises the rare earth metal in a concentration ranging from 0.010 mol/l to 0.1 mol/l.

7. The catalytic system according to claim 1, wherein the saturated or unsaturated inert hydrocarbon solvent is n-pentane.

8. The catalytic system according to claim 1, wherein the alkylating agent is trioctylaluminium.

9. The catalytic system according to claim 1, wherein the halogen donor is an alkyaluminium halide.

10. The catalytic system according to claim 1, wherein a molar ratio of (halogen donor/rare earth salt) has a value ranging from 2 to 3.8.

11. A process for preparing a catalytic system as defined in claim 1, wherein the catalytic system is obtained by: bringing all of the various constituents of the catalytic system into contact with one another, including the preforming isoprene, in one or more steps, for a given time of between 0 and 120 minutes at a temperature ranging from 10° C. to 80° C., and simultaneously or sequentially, preforming the catalytic system for a time of between 0 and 120 minutes at a temperature ranging from 10° C. to 80° C.

12. The process for preparing a catalytic system according to claim 11, further comprising an alkylation step before contact with the halogen donor.

13. A process for synthesizing polyisoprene having a high content of cis-1,4 linkages, comprising polymerizing isoprene in a volatile inert hydrocarbon solvent, the boiling point of which is below 40° C. at atmospheric pressure, continuously or batchwise, in the presence of a catalytic system as defined in claim 1.

14. The synthesis process according to claim 13, wherein the polymerization inert hydrocarbon solvent is the same as the inert hydrocarbon solvent of the catalytic system.

15. The synthesis process according to claim 13, wherein the polymerization inert hydrocarbon solvent is n-pentane.

16. A process for continuously synthesizing polyisoprene having a high content of cis-1,4 linkages, comprising polymerizing isoprene in a volatile inert hydrocarbon solvent, the boiling point of which is below 40° C. at atmospheric pressure, in the presence of a catalytic system, wherein the catalytic system is based at least:
   on isoprene, as preforming monomer;
   on a rare earth metal salt of an organic phosphoric acid, or on a rare earth metal salt of a carboxylic acid;
   on a saturated or unsaturated inert hydrocarbon solvent, the boiling point of which is below 40° C. at atmospheric pressure;
   on an alkylating agent consisting of a trialkylaluminium of formula $AlR_3$, in which R represents an alkyl radical having from 1 to 10 carbon atoms, selected from trimethylaluminium, triethylaluminium, tri-n-propylaluminium, triisopropylaluminium, tri-n-butylaluminium, tri-t-butylaluminium, tri-n-pentylaluminium, tri-n-hexylaluminium, tri-n-octylaluminium, tricyclohexylaluminium;
   on a halogen donor consisting of an alkylaluminium halide, the alkyl radical having from 1 to 8 atoms; wherein this catalytic system comprises the rare earth metal in a concentration greater than or equal to 0.005 mol/l; and wherein
   the polymerization of isoprene takes place in the presence of 0% to 70% by weight of volatile inert hydrocarbon solvent with respect to the total weight of isoprene to be polymerized and of volatile solvent.

17. The synthesis process according to claim 13, further comprising preparing the catalytic system by bringing all of the various constituents of the catalytic system into contact with one another, including the preforming isoprene, in one or more steps, for a given time of between 0 and 120 minutes at a temperature ranging from 10° C. to 80° C., and simultaneously or sequentially, preforming the catalytic system for a time of between 0 and 120 minutes at a temperature ranging from 10° C. to 80° C., and an alkylation step before contact with the halogen donor.

18. A process for synthesizing polyisoprene having a high content of cis-1,4 linkages, comprising polymerizing isoprene in a volatile inert hydrocarbon solvent, the boiling point of which is below 40° C. at atmospheric pressure, in the presence of a catalytic system, wherein the catalytic system is based at least:
   on isoprene, as preforming monomer;
   on a rare earth metal salt of an organic phosphoric acid, or on a rare earth metal salt of a carboxylic acid;
   on a saturated or unsaturated inert hydrocarbon solvent, the boiling point of which is below 40° C. at atmospheric pressure;
   on an alkylating agent consisting of a trialkylaluminium of formula $AlR_3$, in which R represents an alkyl radical having from 1 to 10 carbon atoms, selected from trimethylaluminium, triethylaluminium, tri-n-propylaluminium, triisopropylaluminium, tri-n-butylaluminium, tri-t-butylaluminium, tri-n-pentylaluminium, tri-n-hexylaluminium, tri-n-octylaluminium, tricyclohexylaluminium;
   on a halogen donor consisting of an alkylaluminium halide, the alkyl radical having from 1 to 8 atoms;

wherein this catalytic system comprises the rare earth metal in a concentration greater than or equal to 0.005 mol/l; and wherein a supplementary amount of at least one alkylaluminium compound of formula $AlR_3$ or $HAlR_2$ or $R''_n AlR'_{3-n}$, in which R, R' and R'' represent a saturated or unsaturated alkyl group having from 1 to 20 carbon atoms, n is an integer inclusively from 1 to 3, and H represents a hydrogen atom, is added not at the same time as the catalytic system used for the continuous or batchwise isoprene polymerization reaction, to the polymerization reactor when operating batchwise or to the industrial polymerization unit when it operates continuously.

19. The synthesis process according to claim 18, wherein the amount of said alkylaluminium compound previously brought into contact with the isoprene varies from 10 to 5000 micromoles per 100 g of monomer(s) to be polymerized, as a function of the amount of impurities present in the polymerization medium, such as impurities originating from recycled solvents.

20. The catalytic system according to claim 1, wherein the preforming isoprene and rare earth metal salt have a molar ratio ranging from 5 to 100.

21. The catalytic system according to claim 1, wherein the preforming isoprene and rare earth metal salt have a molar ratio ranging from 15 to 70.

22. The catalytic system according to claim 1, wherein the preforming isoprene and rare earth metal salt have a molar ratio ranging from 25 to 50.

23. The catalytic system according to claim 3, wherein the R' and R'' are selected from the group consisting of: n-butyl, isobutyl, n-pentyl, isopentyl, 2,2-dimethylhexyl, 1-ethylhexyl, 2-ethylhexyl, and tolyl radical.

24. The process according to claim 13, wherein the polyisoprenes have a content of cis-1,4 linkages of at least 96%.

25. The synthesis process according to claim 16, wherein the polymerization of isoprene takes place until a degree of conversion of at least 60% is achieved at the limit of the first third of the reaction volume of the polymerization reactor, and wherein the polymerization reactor is sized so that the standard deviation of the residence time distribution function for the polymerization of isoprene in said reactor is greater than the mean residence time divided by $2\sqrt{3}$, the polymerization medium being stirred by the continuous movement of at least one stirrer about a rotary axis.

26. The catalytic system according to claim 1, wherein the molar ratio of the alkylating agent to rare earth(s) salt ranges from 4 to 15.

* * * * *